Jan. 7, 1936. C. E. ELLIS, JR Re. 19,805
ELEVATOR Orig. 1,979,679
Original Filed Nov. 25, 1932 3 Sheets-Sheet 1
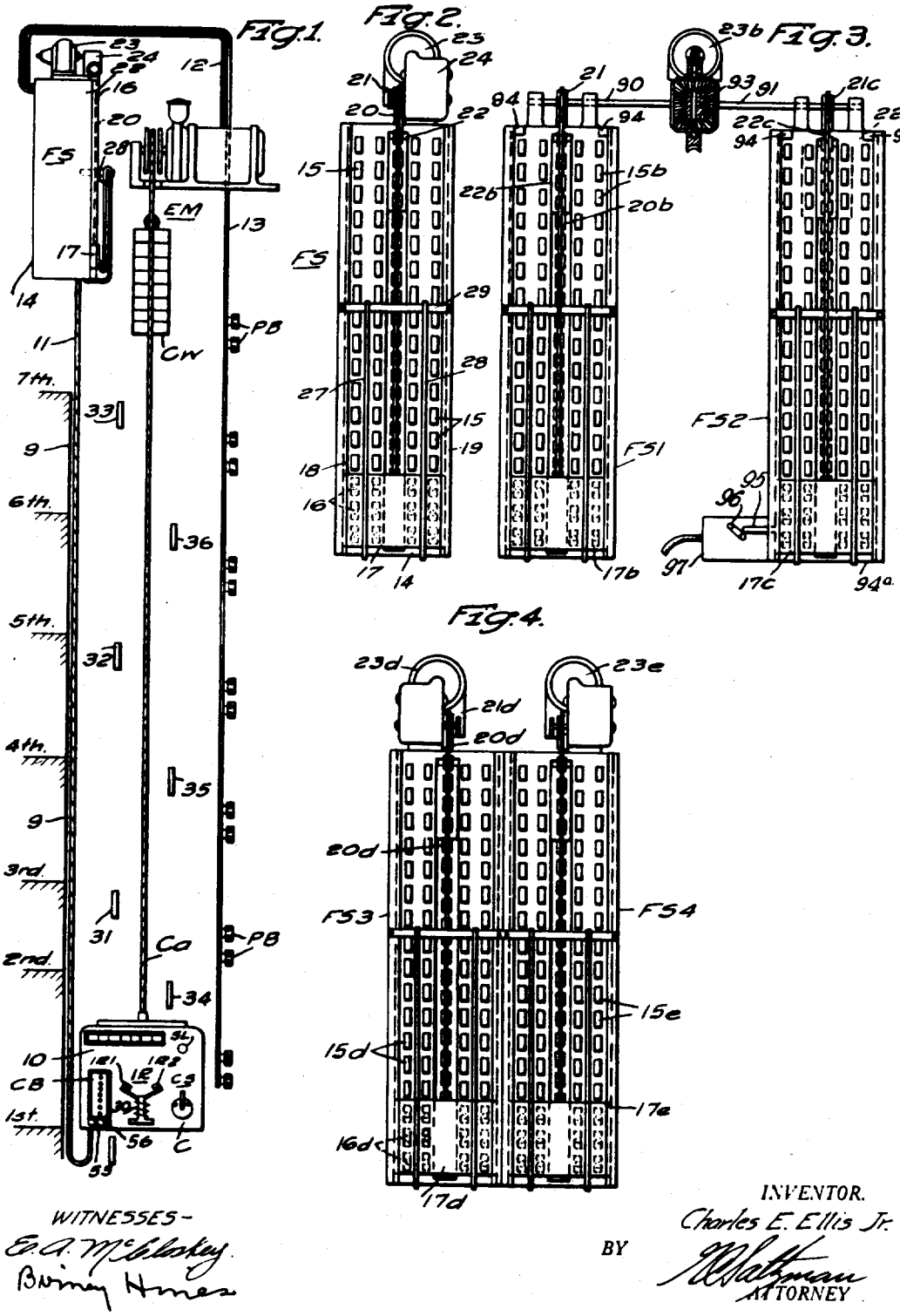
WITNESSES-
E. A. McCloskey
Binney Homes
INVENTOR.
Charles E. Ellis Jr.
BY
Watkins
ATTORNEY Jan. 7, 1936. C. E. ELLIS, JR Re. 19,805

ELEVATOR

Original Filed Nov. 25, 1932 3 Sheets-Sheet 2

WITNESSES—
E. A. Mikelsky
Birney Hines

INVENTOR
Charles E. Ellis Jr.
BY
W. Walfman
ATTORNEY.

Jan. 7, 1936. C. E. ELLIS, JR Re. 19,805
ELEVATOR
Original Filed Nov. 25, 1932 3 Sheets-Sheet 3
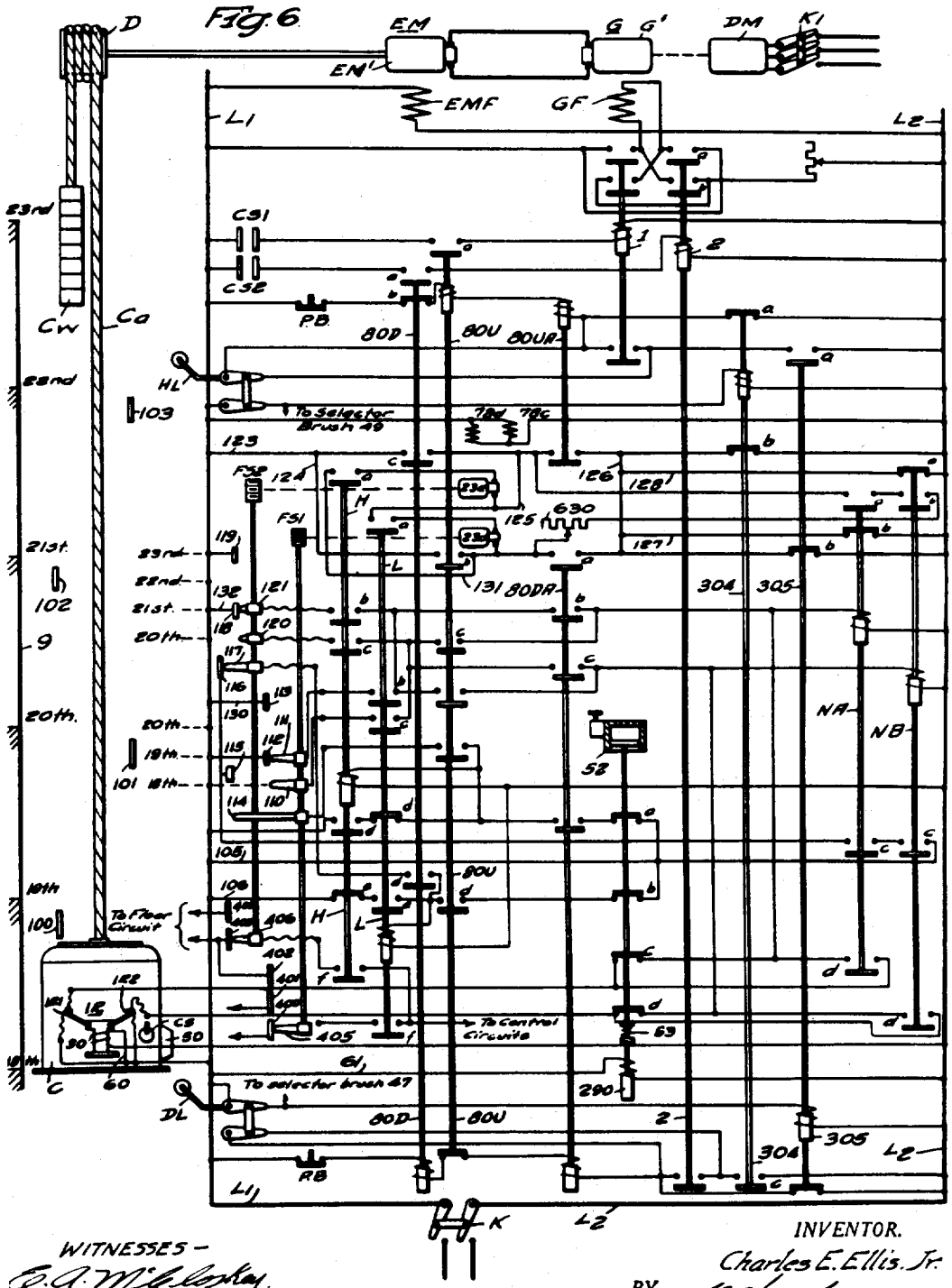
WITNESSES -
E. A. Mikolosky
Burney Hines
INVENTOR.
Charles E. Ellis, Jr.
BY
ATTORNEY Reissued Jan. 7, 1936

Re. 19,805

UNITED STATES PATENT OFFICE 19,805

ELEVATOR

Charles E. Ellis, Jr., Mahwah, N. J., assignor to Westinghouse Electric Elevator Company, Chicago, Ill., a corporation of Illinois Original No. 1,979,679, dated November 6, 1934, Serial No. 644,176, November 25, 1932. Application for reissue March 8, 1935, Serial No. 10,062

34 Claims. (Cl. 187—29)

My invention relates to elevators and more particularly to the construction and operation of auxiliary apparatus for elevators such as floor selectors, position indicators, etc.

One object of my invention is to provide a means for driving elevator auxiliary apparatus in step-by-step motion, in accordance with the movements of the elevator car, whereby the auxiliary apparatus may be located in any desired position, either in the pent-house or on the car.

Another object is to provide for so driving a floor selector that the contact segments thereon may be spaced apart any desirable uniform distance without regard to, and independent of, the distance between the floors served by the car.

A further object is to provide for so constructing and driving the floor selectors utilized in tall buildings that their contacts segments may be mounted upon a plurality of side-by-side panels to permit ready and convenient installation of the selectors in rooms having rather low ceilings.

It is also an object to provide a means for operating the floor selectors and position indicators which will, if it moves out of its correct position, automatically reset itself at either terminal to insure its accurate operation.

Other objects of the invention will be obvious or become evident from the following description taken in conjunction with the accompanying drawings, in which:

Figure 1 is a diagrammatic representation of an elevator installation embodying my invention;

Fig. 2 is a view, in front elevation, of the floor selector included in the elevator system illustrated in Fig. 1;

Fig. 3 is an enlarged view, in front elevation, of a modified form of the floor selector shown in Fig. 2;

Fig. 4 is an enlarged view, in front elevation, of a further modification of the floor selector shown in Fig. 2;

Fig. 6 is a diagrammatic representation of a modified form of the control system shown in Fig. 5, for operating the floor selector illustrated in Fig. 3.

Figure 5:
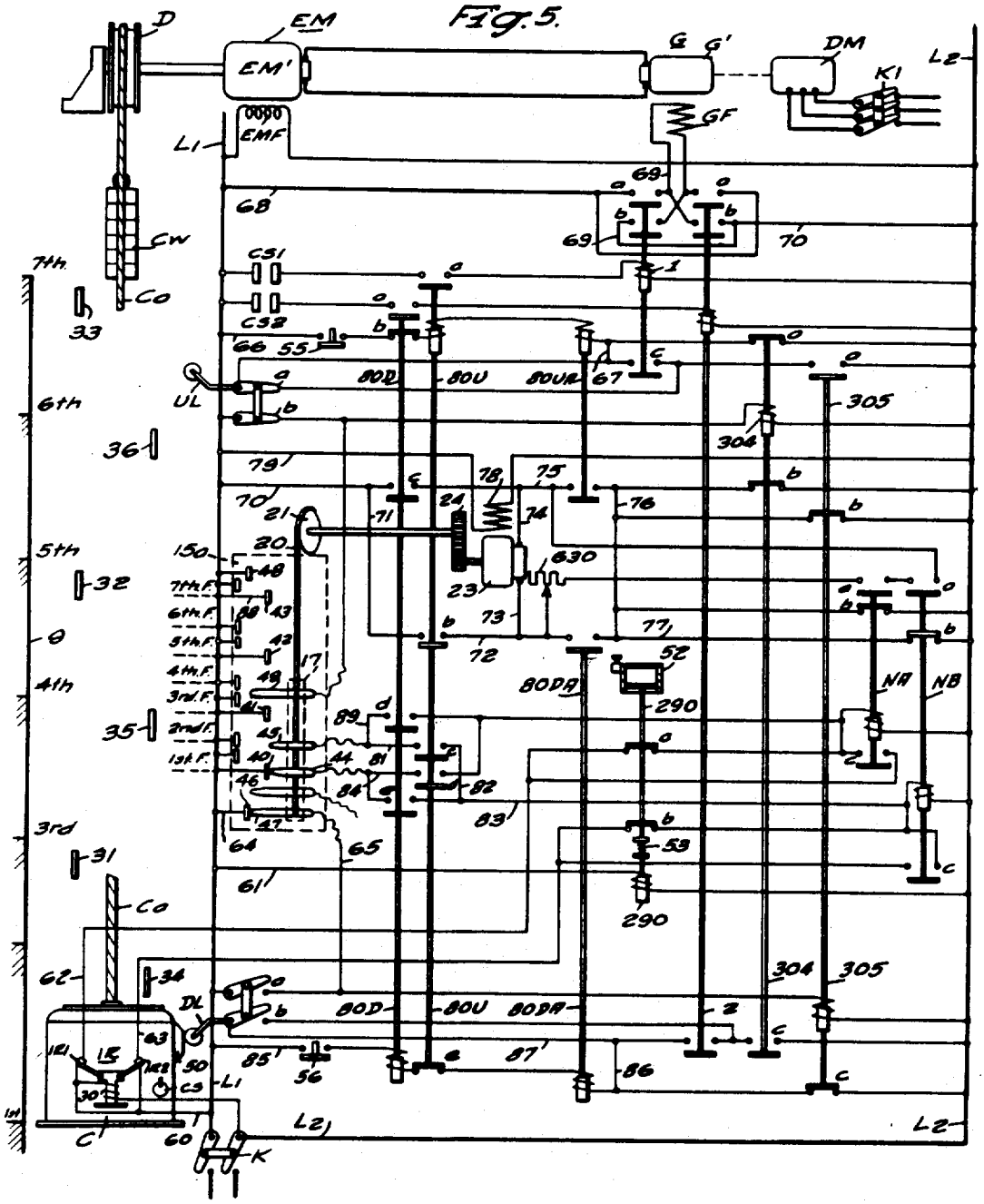
Fig. 5 is a diagrammatic representation of the control system provided for operating the floor selector associated with the elevator shown in Fig. 1.

Although the driving means included in my invention may be conveniently employed for operating the various forms of auxiliary apparatus as requires movement in accordance with the movement of the car, I have illustrated it, for explanatory purposes, as employed for operating a floor selector.

Referring more particularly to Fig. 1 of the drawings, I have illustrated therein an elevator car C as suitably suspended upon a cable Ca in a hatchway S. The cable passes over a hoisting drum D to a suitable counterweight Cw. The hoisting drum D is directly coupled to the armature EM' of a hoisting motor EM (see Fig. 5) the field winding EMF of which is connected for constant voltage energization, to a pair of supply conductors L1 and L2 which may be connected to a suitable source of supply by a switch K.

A variable voltage system of control may be provided for operating a hoisting motor EM wherein the armature EM' of the hoisting motor is connected in loop-circuit with the armature G' of the generator G. The generator G is provided with a separately excited field winding GF.

The armature G' of the generator G is suitably driven by means of a driving motor DM, which may be connected to a suitable source of supply by means of a switch K1.

The direction and speed of the hoisting motor EM may be suitably controlled by controlling the direction and value of the excitation current that is supplied to the separately excited field winding GF of the generator G.

The direction of the excitation current for the field winding GF may be suitably controlled by means of an up-direction switch 1 and a down-direction switch 2.

The value of the current supplied to the field winding may be controlled by any one of the well-known suitable means (not shown).

The operation of the up-direction and the down-direction switches 1 and 2 may be controlled by means of a car switch CS mounted upon the car C in position to be actuated by an attendant thereon.

A signal lamp SL is disposed within the car by means of which signals may be given to the car attendant to stop the car at the floor landings.

Two signal registering push-buttons PB are mounted at each of the landings intermediate the terminal floors, one for up travel and one for down travel, in order that waiting passengers at a floor landing may register signals for stops to be made at that landing which will cause the signal lamp SL in the car to give the attendant on the car a stop signal as the car approaches that landing.

A plurality of push-buttons CB (one for each floor) are mounted in the car C to be operated by the car attendant when he desires to prepare the signal lamp SL to indicate stops to permit passengers to get off at corresponding floors.

A position indicator 10 is disposed in the car to keep the passengers and the car attendant informed as to the position of the car relative to the floors past which it operates.

In order that the various circuits for the push-buttons, the signal lamp, the position indicator and the control circuits indicated by the wiring cables 11, 12 and 13 may be connected in accordance with the position of the car, the car is provided with a floor selector FS. The floor selector may be located at any suitable point, for example, in the pent-house or the elevator shaft and, as illustrated, is, in general, similar to those usually employed in elevator systems. Since the manner of connecting the floor lanterns, hall and car push-buttons, and position indicator to the floor selector is well known, such connections have been omitted from the drawings in the interest of clarity.

As shown in Figs. 1 and 2, the floor selector FS comprises a stationary frame 14 the front portion of which supports a plurality of stationary contact segments 15 disposed to cooperate with and be engaged by a plurality of contact brushes 16 supported and operated by a movable member such as a brush carriage 17. The carriage 17 is slidably disposed between a pair of track rails 18 and 19 in such manner that it may be moved up and down by a chain 20 to one end of which it is attached. The other end of the chain passes over a sprocket wheel 21 to a counterweight 22 which serves to balance the weight of the brush carriage when the selector is in operation. The sprocket wheel is operated by an electric motor 23 through reduction gearing 24, and a friction clutch arranged to slip at a predetermined driving torque. Operation of the motor moves the carriage 17 up and down and thereby causes the fingers to pass over and make engagement with the contact segments.

The contact segments 15 and the contact brushes 16 are so connected to the conductors for the circuits of the push-buttons, the signal lamp, the car control, the indicator, etc., that the up and down movement of the carriage connects these circuits in accordance with the position of the car with reference to the floors served. The conductors connected to the brushes 16 are grouped in cables 27 and 28 and extend in a loop from the carriage 17 to a supporting bracket 29 disposed on the central portion of the selector. This permits the ends of the cables to readily follow the movements of the carriage over the contact segments without adding additional weight to the carriage.

Heretofore in constructing motor operated floor selectors, it has been necessary to space the contact segments on the selector such a distance apart in a vertical line as would correspond exactly to the distance between the floors; that is, if the first and second floors were farther apart than the second and third floors, the contact segments corresponding to the first and second floors would have to be placed farther apart on the selector than those for the second and third floors. This spacing had to be followed so that when the brush carriage was moved in accordance with the movement of the car, the brushes would be moved to and engage the segments corresponding to the floor at which the car was positioned.

In order to avoid this necessity of spacing the contact segments in exact correspondence to the distance between the floors, I have provided a novel selector operating means as illustrated in Fig. 5.

As shown in Fig. 5, the selector motor 23 is operated by a device such as an inductor relay IR disposed in the car to cooperate with a plurality of devices such as induction plates disposed in the hatchway and by a plurality of contact segments and brushes on a portion of the floor selector (as represented by the dotted enclosure 15a).

The relay IR operates to start the motor each time the car approaches a floor and the brushes and contact segments operate to stop the motor after it has travelled a predetermined distance, thereby causing the brush carriage to be moved an equal distance and then stop each time the car arrives at a floor regardless of the distance between the floors.

Inasmuch as the carriage moves an equal distance each time the car arrives at a floor, it is apparent that the contact segments on the selector may be placed an equal distance apart regardless of the distance between the floors.

Similarly, in buildings having long express zones through which the car moves without stopping, such zones may be treated as only one floor in the design of the floor selector, thereby materially reducing the size of the selector.

The inductor relay IR is provided with a suitable coil 30 which is connected for constant energization to the supply conductor L1 and L2. The relay is also provided with two switch arms carrying, respectively, contact members IR1 and IR2. The switch arm associated with contact members IR1 is so disposed as to be successively operated by a plurality of inductor plates 31, 32 and 33, and the arm associated with contact members IR2 is so disposed as to be successively operated by a plurality of inductor plates 34, 35 and 36.

The inductor plates are secured to the side walls of the hatchway (not shown) in such positions that one or the other of the switch arms will be operated to open the contact members associated therewith whenever the car is about mid-way between any two adjacent floors, so that the selector motor 23 will start at that time.

With the inductor plates and the relay IR located as described, the operation of the motor 23 thereby will cause the carriage on the floor selector to move to and stop on the contact segments for the next floor while the car is at or passing that floor, thus causing all of the circuits pertinent to that floor to be prepared at the proper time and in the proper sequence.

The portion of the floor selector, diagrammatically represented by the dotted panel 15a, includes a plurality of stationary contact segments 40, 41, 42 and 43, one for each of the first, third, fifth and seventh floors, and a pair of cooperating brushes 44 and 45. These brushes are so disposed that when brush 44 is on one of the contact segments, brush 45 is half-way between that segment and the next segment. Also included in the panel are a bottom resetting contact segment 46 to be engaged by a brush 47 when the car reaches its lower terminal, and a top resetting contact segment 48 to be engaged by a brush 49 when the car has reached its upper terminal.

Adjacent to the section 15a of the floor selector shown in Fig. 5 are a number of dotted lines disposed according to the floor levels to indicate the points at which the floor selector carriage is stationed when the car is at any particular floor.

One brush on the movable carriage is marked with an X to indicate the particular portion of the carriage that is opposite the dotted lines when the selector is at the corresponding floor.

The various relays and switches illustrated in Fig. 5 cooperate with the apparatus already described to control the selector motor 23, in the following manner.

Two pairs of contact members CS1 and CS2, shown in the upper left-hand corner of the diagram, may be closed by any suitable control system, for instance, one including such a means as the car switch CS. The contact members CS1 control the energization of the up-direction switch 1 and the contact members CS2 control the energization of the down-direction switch 2, to cause upward and downward movement of the elevator car, respectively.

An up limit switch UL and a down limit switch DL operated by a cam 50 disposed on the car are provided for resetting the selector at the respective terminals, in the event the car and the selector get out of synchronism.

A pair of up-direction relays 80U and 80UA are provided for preparing the circuit of the selector motor for operation in the up direction, and a pair of down-direction relays 80D and 80DA are provided for preparing the circuit of the selector motor for operation in the down direction.

A pair of relays NA and NB, known as notching relays, are provided for energizing the selector motor to cause it to move ahead a predetermined distance each time the car comes to a floor. These relays are controlled by the inductor relay IR on the car and by the contact brushes 44 and 45 in cooperation with the contact segments 41, 42 and 43 on the floor selector.

A starting relay 290 is provided for starting the energization of the notching relays NA and NB when power is first turned on in preparing the car for operation. This relay is provided with a dash-pot 52 and a spring 53 which cause it to hold its contact making position for a short time after it is energized.

A dynamic braking resistor 630 is associated with the armature of the selector motor 23 in position to be inserted in a short circuit around the armature to stop it quickly and prevent coasting when its power is shut off.

A top resetting relay 304 is provided for resetting the selector at the upper terminal if it should get out of its accurate position and a bottom resetting relay 305 is provided for resetting the selector at the lower terminal under similar conditions.

My invention may be understood best by an assumed operation thereof.

Let it be assumed that the car is standing at its lower terminal and that the switches K1 and K are closed to prepare the car for operation. The closing of switch K1 connects the driving motor M to its source of supply to prepare the hoisting mechanism for operation.

The closing of switch K connects the control system to its source of supply and thereby immediately energizes the coil of the inductor relay IR, the resetting relay 304, the resetting relay 305 and the starting relay 290.

The circuit for energizing the inductor relay IR extends from supply conductor L1 through conductor 60 and the coil 30 to the supply conductor L2 and causes the relay to remain energized and ready for operation by its cooperating inductor plates while the car remains in service.

The circuit for energizing the starting relay 290 extends from supply conductor L1 through conductor 61 and the coil of the relay 290 to the supply conductor L2. This relay is provided with a dash-pot 52 which prevents it from operating its contact members for a predetermined time after it is energized and therefore it affords a means for energizing the notching relays NA and NB to start them in operation.

The relay NA is energized by a circuit extending from the supply conductor L1 through conductor 60, the contact members IR1, conductor 62, the contact member *a* of relay 290 and the coil of relay NA to the supply conductor L2.

The relay NB is energized by a circuit extending from the supply conductor L1 through conductor 60, the contact members IR2, conductor 63, the contact members *b* of relay 290 and the coil of relay NB to the supply conductor L2.

The notching relays NA and NB, upon being energized, close their contact members *c* to complete self-holding circuits that cause them to remain energized until the car passes an inductor plate.

The circuit for the coil of resetting relay 305, closed for energization by the switch K, extends from the supply conductor L1, through conductor 64, contact segment 46, contact brush 47, conductor 65 and the coil of relay 305 to the supply conductr L2.

The energization of the relay 305 closes its contact members *a* and thereby energizes the up-direction relays 80U and 80UA for preparing the control system for up-direction operation of the car. The circuit extends from supply conductor L1 through conductor 66, the contact members of "down" push-button 55, the contact members *b* of relay 80D, the coils of relays 80U and 80UA, conductor 67, the contact members *a* of switch UL and contact members *a* of relay 305 to supply conductor L2.

Upon energization of the up-direction relay 80U, its contact members *a* close to prepare a circuit for the up-direction switch 1; its contact members *b* close one gap in the armature circuit of the selector motor 23 for operating it in the up-direction; its contact members *c* and *d* close to prepare circuits of the notching relays NA and NB for operation in the up direction; and its contact members *e* open to interlock the down direction relays 80D and 80DA to prevent their energization while the car is operating upwardly.

The energization of the relay 80UA closes its contact member to complete another gap in the armature circuit of the selector motor 23 for up-direction operation.

Assuming now that the car attendant moves the car switch CS to operate the car upwardly, then the contact members CS1 close to energize the up-direction switch 1 to move the car upwardly by a circuit extending from the supply conductor L1 through the contact member CS1, the contact members *a* of relay 80U and the coil of up-direction switch 1 to the supply conductor L2.

The energization of the up-direction switch 1 closes its contact members *a* and *b* to complete a circuit for energizing the generator windings GF for energizing the generator G and through it the motor DM to effect the upward hoisting of the car. This circuit extends from supply conductor L1 through conductor 68, the contact members *a* of switch 1, conductor 69, the field winding GF, the contact member *b* of switch 1 and conductors 69 and 70 to the supply conductor L2.

The energization of the generator G now moves the car upwardly and, as it leaves the lower floor, the cam 50 rides off the limit switch DL, thus permitting that switch to close its contact members *a* and *b*. The closing of the contact members *a* complete a holding circuit for the resetting relay 305 to take the place of the former circuit which extended through the contact segment 46 and the contact brush 47 but which will be opened as soon as the selector moves to the next floor.

As the car continues moving upwardly, the inductor relay IR is brought opposite the inductor plate 34 which operates the switch arm bearing the contact members IR2 to open those contact members. The opening of these contact members opens the holding circuit of the notching relay NB and deenergizes that relay which thereupon closes its back contact members *b* to complete a circuit for energizing the armature circuit of the selector motor 23.

The circuit just completed for the armature of the motor 23 extends from supply conductor L1 through conductors 70 and 71, the contact members *b* of relay 80U, conductors 72 and 73, the armature of motor 23, conductors 74 and 75, the contact members of relay 80UA, conductors 76 and 77, and the back contact members *b* of notching relay NB to the supply conductor L2.

Inasmuch as the field winding 78 of the motor 23 was energized by the closing of the switch K by a circuit extending from supply conductor L1, through conductor 79 and the field winding 78 to the supply conductor L2, the present excitation of the armature causes the motor to operate in the up direction, thereby effecting, through the reduction gearing 24, a rotation of the sprocket wheel 21 and a consequent lifting of the sprocket chain 20 and the brush carriage 17 on the floor selector (see Fig. 2).

Referring again to Fig. 5, the upward movement of the carriage 17 moves the brush 44 off the contact segment 40 and the brush 45 into engagement with the contact segment 41. As soon as the contact brush 45 engages the contact segment 41, a circuit is completed for re-energizing the notching relay NB to open its back contact members *b* and to close its front contact members *a* and *c*. This circuit extends from supply conductor L1 through conductor 80, contact segment 41, brush 45, conductor 81, the contact members *c* of relay 80U, conductors 82 and 83 and the coil of relay NB to supply conductor L2.

The opening of the back contact member *b* of the energized relay NB opens the circuit of the motor 23 and the closing of the front contact members *a* of the relay NB completes a short circuit around the armature and through the dynamic braking resistance 630 to stop the motor quickly and prevent coasting.

The carriage 17 of the floor selector is now disposed upon the contact segments corresponding to the second floor and remains there until the car, in moving toward the third floor, reaches a point where the switch arm of relay IR bearing the contact members IR1 comes adjacent to the inductor plate 31 and is thereby operated to open the contact members IR1.

The opening of the contact members IR1 deenergizes the notching relay NA, thereby causing it to close its back contact members *b* and open its front contact members *a* and *c*. The closing of the contact members *b* of relay NA again closes the circuit for the selector motor 23, which starts immediately to move the floor selector carriage 17 to the contact segments for the third floor.

The movement of the brush carriage 17 causes the brush finger 45 to move off the contact segment 41 and the brush finger 44 to take its place thereon. The engagement of the brush 44 with the contact segment 41 completes a circuit for reenergizing the notching relay NA which circuit extends from the supply conductor L1 through conductor 80, contact segment 41, brush 44, conductor 84, the contact members *d* of relay 80U and the coil of relay NA to the supply conductor L2.

The reenergization of the notching relay NA opens its back contact members *b* and closes its front contact members *a* and *c*. The opening of the back contact members *b* deenergizes the selector motor 23 while the closing of the front contact members *a* reestablishes the short circuit including the dynamic braking resistor 630 around the armature of motor 23 and thus brings that motor to an instant stop. The closing of the contact members *c* on the notching relay NA reestablishes a holding circuit for that relay which is controlled by the contact members IR1.

The aforesaid operation continues as the car moves upwardly; that is, each time the car passes an inductor plate, the selector motor 23 starts to move the brush carriage from the contact segments for one floor to the contact segments for the next floor and, as soon as the carriage reaches the next floor position, the engagement of the brushes and the contact segments stops the motor. Thus the car starts the motor and the selector stops it after it runs a predetermined distance.

As the car reaches the seventh floor (in this instance the upper terminal floor), the car attendant moves the car switch CS to open the contact members CS1 thereby deenergizing the up-direction switch 1 to stop the car.

The opening of the front contact members *c* on the deenergized direction relay 1 opens one gap in the circuit for the energized up-direction relays 80U and 80UA. Inasmuch as the resetting relay 304 is energized, its contact members *a* are open and thus another open gap exists in the circuit for the up-direction relays 80U and 80UA. As the car C comes into the top floor, its cam 50 engages and opens the up limit switch UL. The opening of the contact members *a* of switch UL opens another gap in the circuit for the up-direction relays 80U and 80UA, and thereupon these relays are deenergized.

Although the relay 304 was energized through the contact members *b* of limit switch UL it should be noted that the movement of the floor selector to the contact segments for the 7th floor caused the brush 49 on the floor selector carriage 17 to engage the contact segment 48 as the car reached the upper terminal and thereby provided a holding circuit for the relay 304 while the up limit switch UL remains open.

It may happen in the operation of the floor selector that it misses a notch and falls behind the movements of the car. In such an event, the contact brush 49 would fail to engage the contact segment 48 and therefore no holding circuit for the resetting relay 304 would be maintained when the car reached its upper terminal and opened the up limit switch UL. Under such conditions, the relay 304 would close its contact members and maintain the up-direction relay 80U and 80UA in an energized position until the floor selector carriage caught up with the movement of the car. It will be understood, that if the selector reaches the limit of travel prior to the arrival of the car at its limit, the frictional driving connection between motor 23 and sprocket 21 will release.

From this it will be apparent that the up-direction relays 80U and 80UA will not be deenergized until both the up-direction switch and the up limit switch are opened.

Returning now to the deenergization of the up-direction relays 80U and 80UA, the closing of the back contact member *e* of deenergized relay 80U completes a circuit for energizing the down-direction relays 80D and 80DA. This circuit extends from supply conductor L1 through conductor 85, the contact members of "up" push-button 56, the coil of relay 80D, the contact members *e* of relay 80U, the coil of relay 80DA, conductors 86 and 87, the contact members *b* of switch DL and the contact members *c* of relay 304 to the supply conductor L2.

Upon energization of the down-direction relay 80D, its contact members *a* close to prepare a circuit for down-direction switch 2; its contact members *b* open for interlocking up-direction relay 80U; its contact members *c* close for reversing the selector motor circuit for operation in the down direction; and its contact members *d* and *e* close to complete circuits between the brushes 44 and 45 and the coils of the notching relays NA and NB for energizing those relays respectively as the car passes corresponding inductor plates while running in the down direction.

Assuming now that the car attendant moves the car switch CS to close the contact members CS2 for operating the car in the down direction, then the closing of the contact members CS2 completes a circuit for energizing the down-direction switch 2. This circuit extends from supply conductor L1 through the closed contact members CS2, the closed contact members *a* of relay 80D and the coil of down-direction switch 2 to the supply conductor L2.

The energization of the down-direction switch closes its contact members *a* and *b* to complete a circuit to energize the field winding GF of the generator G to start the car downward, which circuit extends from supply conductor L1 through conductor 68, the contact members *a* of switch 2, the winding GF, conductor 69, the contact members *b* of switch 2, and conductor 70 to the supply conductor L2. Upon the energization of the field winding GF, the motor operating mechanism starts the car downwardly.

As the car leaves the top floor, the car 50 rides off the limit switch UL thereby causing that switch to close its contact members *a* and *b*. The closing of the contact members *a* of switch UL prepares a circuit through which the up-direction relays may be energized when the car is to be moved upward. The closing of the contact members *b* of switch UL maintains a circuit for energizing the relay 304 when the contact brush 49 moves off the contact segment 48.

As the car continues its downward trip toward the 6th floor, the arm of relay IR bearing the contact members IR1 comes adjacent the inductor plate 33 which operates it to open the contact members IR1, thereby deenergizing the notching relay NA.

The deenergization of the notching relay NA closes its back contact members *b* and thereby again restores the hereinbefore described circuit for the selector motor 23. Thereupon, the selector motor starts operation in the down direction and thereby lowers the brush carriage 17 to bring it into engagement with the contact segments corresponding to the 6th floor. This movement of the carriage causes the contact brush 44 to move off the contact segment 43 (see section of selector indicated as panel 15*a* in Fig. 5), and the brush 45 to engage that segment. The engagement of the brush 45 and the contact segment 43 completes the circuit for energizing the notching relay NA to stop the selector motor. This circuit extends from supply conductor L1, through conductor 88, contact segment 43, brush 45, conductor 89, the contact members *d* of down direction relay 80D, and the coil of notching relay NA to the supply conductor L2.

The energization of the relay NA causes it to open its back contact members *b* to deenergize the selector motor 23; to close its front contact members *a* for inserting the dynamic braking resistor 630 in a short circuit around the selector motor armature; and to close its front contact members *c* to provide a holding circuit for itself. Thus the selector motor is stopped as soon as it moves the brush carriage 17 to the contact segments corresponding to the 6th floor.

As the car continues its downward trip past the 6th floor to the 5th floor, the inductor relay arm bearing the contact members IR2 comes opposite the inductor plate 36, when the car is approximately midway between the floors, and is thereby operated to open the contact members IR2 to deenergize the notching relay NB, to again start the selector motor 23.

The deenergization of the notching relay NB operates to close its back contact members *b* to again restore the energizing circuit for the selector motor 23, which now operates to move the brush carriage 17 to the contact segments for the 5th floor. When the brush carriage engages the 5th floor segments, the brush 45 engages the contact segment 42 and thereby completes a circuit for energizing the relay NB to stop the selector motor.

The energization of relay NB opens its back contact members *b* and thereby opens the circuit of motor 23. At the same time the relay NB closes its front contact members *a* to reinsert the dynamic braking resistor 630 in a short circuit of the selector motor armature to stop the motor quickly and prevent coasting; and closes its front contact members *c* to complete a holding circuit for itself.

The operation of the floor selector continues from floor to floor in this manner as the car moves to the lower terminal; that is, the selector carriage 17 is moved to a new set of contact segments each time the car passes from one floor to the next floor regardless of the distance between the floors.

If it is desired to reverse the movement of the car at any time while it is in a position between its terminals, one or the other of the "up" and "down" push-buttons 55 and 56, (see the car in Fig. 1 and the diagram in Fig. 5), may be operated for this purpose.

If the attendant desires to reverse the car while it is travelling downwardly, he may do so by pressing the up push-button 56 to deenergize the down-direction relays 80D and 80DA. The deenergization of the down-direction relay 80D closes its back contact members *b* to energize the up-direction relays 80U and 80UA thereby conditioning the car for upward operation, so that closing of the up-direction contact members CS1 will operate the up-direction switch 1 to move the car upwardly.

On the other hand, if the attendant desires to reverse the car while travelling upward, operation of the "down" push-button 55 will open the circuit for the up-direction relays 80U and 80UA thereby deenergizing these relays. When these relays are deenergized, the back contact members *d* on the up-direction relay 80U closes the circuit for the down-direction relays 80D and 80DA, thus causing the control system to be in condition for operating downwardly.

As has been hereinbefore stated, floor selectors are usually constructed for installation in a vertical position and inasmuch as the selectors must be provided with contact segments for each floor, it is quite a problem to find a place with a sufficiently high ceiling in which to install them when the building is very tall and has an exceeding large number of floors. To overcome this difficulty and permit the floor selector to be installed in two short vertical sections instead of one tall section, I have provided the structure shown in Fig. 3.

As shown in Fig. 3, the floor selector is constructed in two sections FS1 and FS2. The section FS1 may be similar to the corresponding selector shown in Fig. 2 in that it is provided with a plurality of contact segments 15*b*, a brush carriage 17*b* supporting a plurality of brushes 16*b* in cooperative relation to the contact segments 15*b*, and a chain 20*b* connected to the brush carriage 17*b* and extending over a sprocket wheel 21*b* to a weight 22*b*.

The section FS2 of the floor selector is similar to the section FS1 except that its brush carriage 17*c* is made much heavier than the brush carriage 17*b* of the section FS1. The sprocket wheel 21*b*, is mounted on a rotatable shaft 90 and the sprocket wheel 21*c* is fixed upon a rotatable shaft 91. The inner ends of the rotatable shafts 90 and 91 are connected to a suitable differential gearing 93 to be operated by a selector motor 23*b*, which may be driven in any suitable manner, such for instance as that just described in connection with Fig. 5.

The section FS2 is also different from section FS1 in that its carriage 17*c* rests upon blank contact segments at its lowermost position. The carriage is also provided with a projection 95 in position to engage a switch 96, in a casing 97 for transferring the floor circuits and control circuits from carriage 17*b* to carriage 17*c* when carriage 17*c* starts upwardly.

It is to be understood that the counterweights attached to the chains 22*b* and 22*c* are of the same size and that they should be of such size as to keep the chains under tension and in good working engagement with the sprocket wheels. If desired, the counterweights may also be made heavy enough to counterbalance a small portion of the weight of the carriages in order to reduce the work on the driving motor. However, they should not be made so heavy that they will prevent the carriage 17*c* from having a greater downward pull on its chain than the carriage 17*b* has on its chain.

With the construction shown in Figs. 1 and 3, in which the car C and the counterweighted members 17*b* and 17*c* are in their lowermost positions, energization of the motor 23*b* in its "up" direction when the car is started upwardly will cause the carriage 17*b* to be lifted first through the operation of the differential gearing 93, the shaft 90, the sprocket wheel 21*b* and the chain 20*b* by reason of the fact that the carriage 17*c* is much heavier than the carriage 17*b*. When the carriage 17*b* reaches the top of its selector it will strike the projections 94 and come to a stop. If desired, the projections 94 may be constructed of rubber or springs to cushion the impact of the carriage. However, when the motor 23*b* continues operation in the up-direction the fact that the carriage 17*b* cannot move any further will stop the rotation of the shaft 90 and cause the differential gearing 93 to effect an upward movement of the carriage 17*c* through the operation of the shaft 91, the sprocket wheel 21*c* and the chain 22. Further upward travel of the elevator car will, of course, be accompanied by further upward movement of the carriage 17*c*.

In order that carriage 17*c* may be out of engagement with active segments during movement of carriage 17*b*, and that carriage 17*b* may be out of engagement with active segments during movement of carriage 17*c*, the upper limit of carriage 17*b* is spaced somewhat above the uppermost segments associated therewith, and the lower limit of carriage 17*c* is spaced somewhat below the lowest segments associated therewith. With this arrangement, a single notching operation at the transfer floor, during upward car travel, first drives carriage 17*b* out of engagement with active segments, and then drives carriage 17*c* into engagement with active segments. During downward travel, a reverse operation occurs.

Upon reversing the operation of the motor 23*b*, the carriage 17*c* will be lowered through the differential 93, first, by reason of its greater weight until it reaches its lower terminal and rests against the projections 94*a* thereon, in which position it has reversed the switch 96 and transferred the floor and control circuits to the carriage 17*b*. Further rotation of the motor 23*b* will then cause the carriage 17*b* to descend until it reaches its lower terminal.

In the further modification of the floor selector shown in Fig. 4, for the purpose of permitting installation in low-ceiling rooms, the floor selector sections FS3 and FS4 are illustrated as placed in close side-by-side position, with individual motors for operating the brush carriages.

The selector of Fig. 4 is shown as constructed for a relatively high building, each section being provided with contact members for approximately half of the stories. The section FS3 is to be employed, for example, for the stories from one to twenty, and the section FS4 is employed for the remaining floors.

The sections are similar to the sections shown in Fig. 2, the section FS3 being provided with a plurality of contact segments 15*d*, a plurality of contact breakers 16*d* mounted on a brush carriage 17*d*, to be moved over the contact segments 15*d* by a chain 20*d*, a sprocket wheel 21*c*, and a driving motor 23*d*. The section FS4 is constructed exactly like the section FS3 and its brush carriage 17*e* is driven by a motor 23*e*.

The selector is operated in practically the same manner as the selector shown in Figs. 2 and 5 except that as the brush carriage 17*d* reaches the top in the up direction it then disconnects its motor from operation and connects the motor 23*e* for driving the carriage 17*e* on section FS4. When the car leaves the top floor and the carriage 17*e* reaches the bottom of section FS4 it cuts out its motor and connects the motor 23*d* for operation to drive the carriage 17*d* down the section FS3 to connect the contact segments and brushes in accordance with the movement of the car past the floors.

The control system for this double-section arrangement is practically the same as that shown in Fig. 5 except that transverse relays are added to connect and disconnect the motors and the notching relays as well as the signal and control circuits to the carriages when the one brush carriage ceases operation and the other starts operation as the car passes the 20th floor.

The modified control system is diagrammatically illustrated in Fig. 6 in connection with the 18th to the 23rd floors where the operation of the floor selector changes from one brush carriage to the other. In Fig. 6 the control system embodies the same relays and switches as shown in Fig. 5 and they are given the same reference numbers. However, the control system of Fig. 6 is arranged to operate two selector motors 23*d* and 23*e* instead of one selector motor, and a low relay L and a high relay H are provided in connection with two portions of the commutator segments illustrated in Fig. 4, by the dotted rectangles 15*d* and 15*e*.

The low relay L is provided for connecting the motor 23*d* for operation when the car is in the lower half of the building and the seelctor section FS3 is being operated. This relay also closes certain contact members to prepare operating circuits for the notching relays NA and NB when selector section FS3 is operated, as well as transferring necessary circuits from carriage 17*d* to carriage 17*e*.

The high relay H is provided for connecting the motor 23*e* for operation when the car is in the upper half of the building and the selector section FS4 is being operated. This relay also closes certain contact members to prepare operating circuits for the notching relays NA and NB when selector section FS4 is being operated as well as transferring floor and control circuits from carriage 17*e* to carriage 17*d*.

The low relay L and the high relay H are electrically interlocked to prevent operation of the one when the other is in service.

In assuming an operation of the car, it will be considered as having been stationed at the lower terminal, that the switch K was closed, thereby energizing the resetting relays 304 and 305, the starting relay 290, the notching relays NA and NB, the up-direction relays 80U and 80UA, the field windings 18*d* and 18*c* of the selector motors, and the inductor relay IR. In the system shown in Fig. 6 the lay relay L is also energized by the starting relay 290 by the closing of switch K when the car is placed in operation. This initial circuit extends from supply conductor L1, through conductor 105, the contact members *b* of relay 290, the contact members *d* of relay 80U and the coil of relay L to the supply conductor L2.

The energization of the relay L closes its contact members *e*, thereby completing a self-holding circuit for itself extending from supply conductor L1 through conductor 106, the contact members *e* of high relay H, contact members *e* of relay L and the coil of relay L to supply conductor L2. Therefore, relay L remains energized after the starting relay 290 opens its contact members.

Also, upon energization of the relay L it closes its contact members *a* to connect the motor 23*d* to the operating circuit; its contact members *b* and *c* close to connect the brushes 110 and 111 in circuits for operating the notching relays NA and ND; its contact members *d* close to provide a self-holding circuit for itself; and its contact members *f* close to connect the floor circuits and the control circuits through the brush carriage 17*d*.

Assuming now that the car has been operated up to the 18th floor in a manner similar to that described in connection with Fig. 5, and that it is continuing its upward movement, then, as it passes from the 18th floor to the 19th floor, the inductor arm bearing the contact members IR1 passes the inductor plate 100 and is operated to open its contact members.

The opening of the contact members IR1 between the 18th and 19th floors opens the holding circuit of the notching relay NA, thereby deenergizing that relay. The deenergization of the relay NA closes its back contact members *b*, thereby completing a circuit for operating the selector motor 23*d*. This circuit extends from supply conductor L1 through conductors 123 and 124, the contact members *b* of up-direction relay 80U, the armature of motor 23*d*, the contact members *a* of relay L, conductor 125, the contact members of relay 80UA, conductors 126 and 127 and the contact members *b* of relay NA to supply conductor L2.

The operation of the selector motor 23*d* moves the selector carriage 17*d* upwardly to the contact segments for the 19th floor, which in turn, causes the contact finger 111 to move off segment 112, and to cause contact brush 110 to move upon segment 112. The engagement of the brush 110 and the contact segment 112 completes a circuit for energizing the notching relay NA to stop the motor 23*d*. This circuit extends from supply conductor L1 through contact segment 112, brush 110, the contact members *b* of relay L, the contact members *c* of relay 80U and the coil N of relay NA to the supply conductor L2.

The energization of the notching relay NA opens its back contact members *b* to open the circuit of motor 23*d* and the closing of its front contact members *a* places the dynamic braking resistor 630 in a short circuit around the armature of the motor 23*d* to stop the motor quickly without coasting.

The closing of the contact members *b* of the energized relay NA completes a holding circuit for itself where it will energize until the contact members IR1 of the inductor relay are opened.

As the car continues upwardly to the 20th floor that arm of the inductor relay IR bearing the contact members IR2 passes the inductor plate 101 and is thereby operated to open the contact members. The opening of the contact members IR2 deenergizes the notching relay NB which closes its back contact members *a* to start the motor 23*d* to move the selector carriage 17*a* to the contact segments of the 20th floor. This circuit extends from supply conductor L1 through conductors 123 and 124, the contact members *b* of relay 80U, the armature of motor 23*d*, the contact members *a* of relay L, conductor 125, the contact members of relay 80UA, conductors 126 and 128 and the contact members *a* of relay NB to the supply conductor L2.

The operation of the motor 23*d* moves the selector carriage 17*d* up into engagement with the contact segments for the 20th floor. This movement of the carriage causes the contact brush 111 to engage the contact segment 113 on the floor selector section FS3 thereby energizing the notching relay NB through a circuit extending from the supply conductor L1 through conductor 130 the contact segment 113, the brush 111 and thence as formerly described through the coil of relay NB.

The energization of the notching relay NB opens its back contact members *a* to deenergize the motor 23*d* and the closing of the contact members *b* completes a circuit placing the dynamic braking resistor 630 in short circuit with the armature of the motor 23*d* to stop the motor quickly and prevent it from coasting.

The movements of the carriage 17*d* to the contact segments for the 20th floor also causes the brush 114 to move into engagement with the contact segment 115 for the purpose of energizing the high relay H to disconnect the motor 23*d* from its operating circuit and connect the motor 23*e* to the operating circuit, so that if the car goes up the floor selector section FS4 will come into operation. The circuit completed by brush 114 and segment 115 for energizing relay H extends from supply conductor L1 through conductor 105 the contact members c of relays NB and NA, the contact segment 115, brush 114, the contact members *e* of relay 80U and the coil of relay H to supply conductor L2.

The energization of the relay H opens its contact members *e* to open the holding circuit for the low relay L and thereby deenergize relay L.

The energization of the relay H further closes its contact members *a* to connect the motor 23*e* to the operating circuit; closes its contact members *b* and *c* to connect the brushes 120 and 121 to the operating circuits of the notching relay NA and ND; closes its contact members *d* to provide a holding circuit for itself; and closes its contact members *f* to connect the floor circuits and control circuits through the brush carriage 17*e*.

Upon the deenergization of relay L, its contact members *a* open to disconnect the motor 23*d* from the operating circuit; its contact members *b* and c open to disconnect the brushes 110 and 111 from the circuits of the notching relays NA and NB; its contact members *d* close to prepare a circuit through which it may be reenergized when the relay H is deenergized; its contact members *e* open to prevent energization through the activity of relay 290; and its contact members *f* open to disconnect the floor circuits and control circuits from the brush carriage 17*d*.

In the system now being described, both sections FS1 and FS2 of the floor selector are provided with segments corresponding to the 20th, or transfer, floor. To illustrate the transfer of control circuits from selector FS1 to FS2, a representation row of segments 400, 401 and 402, corresponding to the 18, 19 and 20th floors have been illustrated as arranged for cooperation with a brush 405, on selector FS1, and a row of segments 403 and 404, corresponding to the 20th and 21st floors, have been illustrated as arranged for cooperation with a brush 406, on selector FS. While relay L is energized, the 20th floor circuits are controlled through brush 405 and segment 402; while relay H is energized, the 20th floor circuits are controlled through brush 406 and segment 403. It will be understood that a similar transfer arrangement is provided for the other groups of segments on the selector.

Assuming now that the car C continues its upward trip, moving from the 20th floor to the 21st floor, then the arm bearing the contact members IR1 on the inductor relay IR passes the inductor plate 102 and is operated to open the contact members IR1. The opening of the contact members IR1 opens the holding circuit of the notching relay NA and deenergizes that relay.

The deenergization of the relay NA closes its back contact members *b* and thereby completes a circuit for operating the selector motor 23*e* on the selector section FS4. This circuit extends from the supply conductor L1 through conductors 123 and 124, the contact members *b* of relay 80U, conductor 131, the contact members *a* of relay H, the armature of motor 23*e*, conductor 125, the contact members of relay 80UA, conductors 126 and 127, and the contact members *b* of relay NA to the supply conductor L2.

The motor 23*e* now runs in the up direction until it moves the brush carriage 17*e* from its postion on the contact segments associated with the 20th floor to a position on the contact segments corresponding to the 21st floor, in which position the contact brush 120 on the floor selector FS2 engages the contact segment 118 corresponding to the 21st floor, and thereby energizes the notching relay NA by a circuit extending from the supply conductor L1 through conductor 132, the contact segment 118, brush 120, the contact members *b* of relay H, the contact members *c* of relay 80U and the coil of relay NA to the supply conductor L2.

The energization of the relay NA opens its contact members *b* to open the circuit of motor 23*e* and closes its contact members *a* to insert the dynamic braking resistor 630 in a short circuit around the armature of motor 23*e* thereby stopping the motor quickly and preventing it from coasting.

As the car continues from the 21st floor to the 22nd floor the inductor relay IR passes the inductor plate 103 and thereby opens the contact members IR2 thereby deenergizing the notching relay NB to effect operation of the motor 23*e* for moving the brush carriage to the contact segments for the 22nd floor. This operation of the notching relays NA and NB continues from floor to floor as the car moves on up to its upper terminal and consequently the brush carriage 17*e* is moved upwardly over the corresponding floor contact segments, in accordance with the previous description given in connection with Fig. 5.

At the upper terminal, the car may be reversed and started downwardly in the same manner as described in connection with Fig. 5.

Assuming now, that the car has arrived at the 22nd floor on its down trip, then the resetting relays 304 and 305, the starting relay 290, the notching relays NA and NB, the down direction relays 80D and 80DA, the inductor relay IR and the high relay H are energized.

Assuming further that the car moves downwardly from the 22nd floor to the 21st floor, then the inductor relay IR passes the inductor plate 103 thereby opening the contact members IR2 which open the holding circuit of the notching relay NG and deenergize that relay.

The deenergization of the relay NB closes its back contact members *a*, thereby energizing the motor 23*e* to run the brush carriage 17*e* down to the contact segments for the 21st floor. At this point, the brush 120 on the floor selector engages the contact segment 118 and thereby completes a circuit for energizing the notching relay NB to stop the motor. This circuit extends from supply conductor L1 through conductor 132, contact segment 118, brush 120, the contact members *c* of relay H, the contact members *c* of relay 80DA and the coil of relay NB to the supply conductor L2.

The energization of the relay NB opens its back contact members *a* to deenergize the motor 23*e*, and closes its front contact members *b* to insert the dynamic braking resistor 630 for stopping the motor quickly without coasting.

As the car continues downwardly from the 21st floor to the 20th floor, the inductor relay IR passes the inductor plate 102, thereby opening the inductor relay contact members IR1 to effect the operation of motor 23*e*. The opening of these contact members opens the holding circuit of the notching relay NA, thereby deenergizing that relay.

The deenergization of the relay NA closes its back contact members *b*, thereby energizing the motor 23*e* to run the carriage 17*e* to a position below the contact segments for the 21st floor, in which position the brush 121 will engage the contact segment 118 to complete a circuit for reenergizing the relay NA to stop the motor 23*e*.

At the same time, the brush 117 will engage the contact segment 116 for the purpose of effecting a transfer of operation from selector section FS4 to selector section FS3 inasmuch as the car has now moved from the 21st floor to the 20th floor.

In effecting this transfer, the engagement of the brush 117 with the segment 116 completes a circuit that energizes the low relay. This circuit extends from supply conductor L1 through conductor 105, the contact members *c* of relays NB and NA, the contact segment 116, brush 117, the contact members *d* of down direction relay 80D and the coil of relay L to the supply conductor L2. The energization of relay L opens its contact members *d*, thereby deenergizing the high relay H.

Upon the deenergization of relay H, its contact members *a* open to disconnect the motor 23*e* from the operating circuit, its contact members *b* and *c* open to disconnect the brushes 120 and 121 from the operating circuits of the notching relays NA and NB; its contact members *d* open to interlock and prevent its own energization while relay L is energized; and its contact members *f* open to disconnect the floor circuits and the control circuits through the brush carriage 17*e*.

The energization of the transfer or low relay L, in addition to deenergizing the high relay H, also closes its contact members *a* to connect the motor 23*d* to the operating circuit; its contact members *b* and *c* close to re-connect the brushes 110 and 111 to the operating circuits of the notching relays NA and NB; its contact members *e* close to restore its self-holding circuit; and its contact members *f* close to connect the floor circuits and the control circuits through the brush carriage 17*d* of selector section FS3.

With the floor circuits and the control circuits reconnected through the brush carriage 17*d* standing at the 20th floor, the selector is now ready to move its carriage downwardly, floor by floor, with the downward movement of the car.

Assuming that the car leaves the 20th floor and passes to the 19th floor, then the inductor relay IR will pass the inductor plate 101 and will be operated to open the contact members IR2, which will open the self-holding circuit of the notching relay NB and deenergize that relay to start the motor 23*d*.

The deenergization of the relay NB closes its back contact members *a* to complete a circuit for the motor 23*d*. The circuit extends from supply conductor L1 through the motor as previously described. Thereupon the motor 23*d* operates to move the brush carriage 17*d* down to the contact segments corresponding to the 19th floor, where the brush 110 engages the contact segment 112 and stops the motor.

The engagement of the contact segment 112 and the brush 110 completes a circuit for energizing the notching relay NB, which circuit extends from the supply conductor L1 through contact segment 112, brush 110, the contact members *b* of relay L, the contact members *c* of down direction relay 80DA and the coil of relay NB to the supply conductor L2.

The energization of the relay NB opens its back contact members *a* to deenergize the motor 23*d* and closes its contact members *b* to reinsert the dynamic braking resistor 630 in short circuit with the armature of the motor 23*d* to stop the motor quickly without coasting.

A further movement of the car downwardly will cause the operation of the carriage 17*d* downwardly from floor to floor as described in connection with Fig. 5.

From the foregoing, it is apparent that I have provided a floor selector that may be easily and inexpensively manufactured and which may be readily installed and maintained in operation in a vertical position in rooms having either high ceilings or low ceilings.

Although I have illustrated and described only a few embodiments of my invention, it is evident that many modifications and changes therein may be made without departing from the spirit and scope of the appended claims.

I claim as my invention:

1. In an elevator having a car operable past a plurality of floors, an auxiliary device, a motor for operating the said device in accordance with the movements of the car, means responsive to operation of the car for starting said motor in operation, means responsive to movement of the device a predetermined distance for stopping the motor, and means responsive to a reversing operation of the car for reversing said motor.

2. In a floor selector for an elevator car operable past a plurality of floors, a stationary member, a movable member, a motor for actuating the movable member along the stationary member, means operably responsive to operation of the car for starting said motor in operation, means operably responsive to operation of the movable member for stopping the operation of said motor, and means responsive to a reversing operation of the car for reversing said motor.

3. In a floor selector for an elevator car operable past a plurality of floors, a stationary member, a movable member, a motor for actuating the movable member along the stationary member, means operably responsive to movement of the car from one floor to another floor for starting the motor in operation, means operably responsive to movement of the movable member for stopping the motor, and means responsive to a reversing operation of the car for reversing said motor.

4. In a floor selector for an elevator car operable past a plurality of floors, a stationary member, a movable member, a motor for actuating the movable member along the stationary member, means operably responsive to movement of the car from one floor to another floor for starting the motor in operation, means operably responsive to a predetermined movement of the movable member for stopping the motor, and means responsive to a reversing operation of the car for reversing said motor.

5. In a floor selector for an elevator car operable in a hatchway past a plurality of floors, a stationary member, a movable member, a motor for actuating the movable member along the stationary member, a device mounted in the hatchway, means mounted on the car to be operated by the device in the hatchway upon movement of the car past said device for starting said motor in operation, means operably responsive to operation of the movable member for stopping the motor, and means responsive to a reversing operation of the car for reversing said motor.

6. In a floor selector for an elevator car operable in a hatchway past a plurality of floors, a stationary member, a movable member, a motor for actuating the movable member along the stationary member, a device mounted in the hatchway, means mounted on the car to be operated by the device in the hatchway upon movement of the car past said device for starting said motor in operation, means operably responsive to operation of the movable member a predetermined distance for stopping said motor, and means responsive to a reversing operation of the car for reversing said motor.

7. In a floor selector for an elevator car operable in a hatchway past a plurality of floors, a stationary member, a movable member, a motor for actuating the movable member along the stationary member, an inductor plate disposed in the hatchway, between two adjacent floors, an inductor relay disposed on the car in position to be operated by the inductor plate when the car passes the plate for starting the motor in operation, means responsive to movement of the movable member for stopping the motor, and means responsive to a reversing operation of the car for reversing said motor.

8. In a floor selector for an elevator car operable in a hatchway past a plurality of floors, a stationary member, a movable member, a motor for actuating the movable member along the stationary member, a plurality of inductor plates mounted in the hatchway, each of the plates being disposed between each two adjacent floors, an inductor relay disposed on the car in position to be operated by an inductor plate upon movement of the car from one floor to the next floor for starting said motor in operation, means responsive to a predetermined movement of the movable member for stopping the motor, and means responsive to a reversing operation of the car for reversing said motor.

9. A floor selector for an elevator car operable in a hatchway past a plurality of floors, comprising a plurality of rows of stationary members, a movable member for each row of stationary members, motive means for actuating the movable members successively along their respective stationary members, means responsive to movement of the car for starting said motive means in operation, and means responsive to operation of the motive means for stopping said motive means.

10. A floor selector for an elevator car operable past a lower group of floors and a higher group of floors, a stationary member for the lower group of floors, a stationary member for the higher group of floors, a movable member for the stationary member for the lower group of floors, a movable member for the stationary member for the higher group of floors, and means responsive to operation of the car for actuating the first-named movable member along the stationary member for the lower group of floors only while the car is operating in the lower group of floors and for actuating the second-named movable member along the stationary member for the higher group of floors only while the car is operating in the higher group of floors.

11. A floor selector for an elevator car operable in a hatchway past a plurality of floors, comprising a stationary member for a group of lower floors, a second stationary member for a group of upper floors, a movable member for the first stationary member, a movable member for the second stationary member, motive means for operating the movable members successively along their stationary members in accordance with the position of the car at the floors, and means responsive to operation of the first movable member to a position corresponding to the upper one of its floors for transferring the operating effect of the motive means from the first movable member to the second movable member whereby that movable member will be moved along the second stationary member in accordance with further upward movement of the car.

12. A floor selector for an elevator car operable in a hatchway past a plurality of floors, comprising a vertically disposed stationary member for the lower floors, a second vertically disposed stationary member for the upper floors, a movable member for the first stationary member, a means for limiting the upward motion of the movable member, movable member for the second stationary member, said second-named movable member being weighted more than the first-named movable member, means for limiting the downward movement of the second movable member, motive means for operating the movable members, differential gears connecting the motive means and the movable members whereby engagement of one of the movable members with its limiting means while the car is moving will transfer the operating effect of the motive means from that movable member to the other movable member.

13. A floor selector for an elevator car operable in a hatchway past a plurality of floors, comprising a stationary member for a lower group of floors, a stationary member for a higher group of floors, a movable member for the first-named stationary member, a movable member for the second-named stationary member, motive means for said movable members comprising a motor for operating the first-named movable member along the stationary member for the lower group of floors in accordance with the movement of the car past the lower group of floors, a motor for moving the second-named movable member along the stationary member for the higher group of floors in accordance with the movement of the car past the higher group of floors, an operating circuit for said motors, and means responsive to operation of the motors for disconnecting one motor from and connecting the other motor to said operating circuit when the car passes from one group of floors to the other group of floors.

14. A floor selector for an elevator car operable in a hatchway past a plurality of floors, comprising a stationary member for a lower group of floors, a stationary member for a higher group of floors, a movable member for the first-named stationary member, a movable member for the second-named stationary member, motive means for said movable members comprising a motor for operating the first-named movable member along the stationary member for the lower group of floors in accordance with the movement of the car past the lower group of floors, a motor for moving the second-named movable member along the stationary member for the higher group of floors in accordance with the movement of the car past the higher group of floors, an operating circuit for said motors, and means responsive to operation of the movable members for disconnecting one motor from and connecting the other motor to the operating circuit when the car passes from one group of floors to the other group of floors.

15. A floor selector for an elevator car operable in a hatchway past a plurality of floors, comprising a stationary member for a lower group of floors, a stationary member for a higher group of floors, a movable member for the first named stationary member, a movable member for the second-named stationary member, motive means for said movable members comprising a motor for operating the first-named movable member along the stationary member for the lower group of floors in accordance with the movement of the car past the lower group of floors, a motor for moving the second-named movable member along the stationary member for the higher group of floors in accordance with the movement of the car past the higher group of floors, an operating circuit for said motors, means responsive to operation of the motors for disconnecting one motor from and connecting the other motor to said operating circuit when the car passes from one group of floors to the other group of floors, additional circuits connected through the movable members, and means responsive to operation of the movable members for transferring said additional circuits from one movable member to the other movable member when the car passes from one group of floors to the other group of floors.

16. In a floor selector for an elevator car operable in a hatchway past a plurality of floors, a plurality of stationary members one for each floor, a movable member, motive means for actuating the movable member to sequentially engage the stationary members, means responsive to the car leaving a floor for starting said motive means in operation, and means responsive to movement of the movable member to a stationary member corresponding to the next floor for stopping said motive means.

17. In a floor selector for an elevator car operable in a hatchway past a plurality of floors, a body member, a plurality of contact segments for each floor disposed on the body member, a carriage, a plurality of contact members disposed on the carriage, motive means for actuating the carriage to move the contact members over the contact segments, means responsive to movement of the car from one floor to the next floor for starting said motive means, and means responsive to movement of the carriage to the position corresponding to the next floor for stopping the motive means.

18. In an elevator system for operating an elevator car in a hatchway past a plurality of floors, control means for starting, stopping and reversing the operation of the car, and a floor selector comprising a body member, a plurality of contact segments for each floor disposed on the body member, a carriage, a plurality of contact members disposed on the carriage, motive means for actuating the carriage to move the contact members over the contact segments, means responsive to movement of the car from one floor to the next floor for starting said motive means, means responsive to movement of the carriage to the position corresponding the next floor for stopping the motive means, and means responsive to operation of the control means to reverse the car for reversing said motive means.

19. In an elevator system for operating an elevator car in a hatchway past a plurality of floors, control means for starting, stopping and reversing the operation of the car, and a floor selector comprising a body member, a plurality of contact segments for each floor disposed on the body member, a carriage, a plurality of contact members disposed on the carriage, motive means for actuating the carriage to move the contact members over the contact segments, means responsive to movement of the car from one floor to the next floor for starting said motive means, means responsive to movement of the carriage to the position corresponding to the next floor for stopping the motive means, and means for simultaneously conditioning the control system and said motive means for operation in a direction reverse to their previous direction of operation.

20. In a floor selector for an elevator car operable in a hatchway past a plurality of floors, a body member, a plurality of stationary contact segments for each floor disposed on the body member, a carriage, a plurality of contact members disposed on the carriage, motive means for actuating the carriage to move the contact members from the contact segments for one floor to the contact segments of the next floor in accordance with the movement of the car, means responsive to movement of the car from one floor to the next floor for starting said motive means, means responsive to a predetermined movement of the motive means for stopping the motive means, and means responsive to failure of the carriage to move to the contact segments corresponding to the floor to which the car is moved, for continuing the operation of the motive means until the carriage moves to the contact segments corresponding to the position of the car.

21. In a floor selector for an elevator car operable in a hatchway past a plurality of floors, a body member, a plurality of contact segments for each floor disposed on the body member, a carriage, a plurality of contact members disposed on the carriage, motive means for actuating the carriage to move the contact members over the contact segments, a pair of notching relays for controlling the operation of the motive means, means responsive to movement of the car from one floor to another for operating the notching relays to start the motive means, and means responsive to the arrival of the carriage at the position corresponding to the next floor for operating the notching relays to stop the motive means.

22. In a control system including a floor selector for an elevator car operable past a plurality of floors, a series of stationary elements, a movable element, motive means for actuating said movable element to sequentially engage said stationary elements, means responsive to the movement of said car from one floor to another for starting said motive means, and means responsive to the operation of said motive means for stopping further operation thereof.

23. In a control system including a floor selector for an elevator car operable in a hatchway, a plurality of stationary contact members, a movable member disposed to sequentially engage said stationary members, a motor for actuating said movable member, means responsive to movement of the car to a predetermined point in said hatchway for rendering said motor effective to actuate said movable member and means responsive to operation of the motor for stopping further operation thereof.

24. In an elevator having a car operable past a plurality of floors, an auxiliary device, a motor for operating said device in accordance with the movements of the car, means responsive to operation of the car for starting said motor in operation, means responsive to movement of the device a predetermined distance for stopping the motor, and means responsive to a reversing operation of the car for reversing the direction of movement of the device.

25. In a control system including a floor selector for an elevator car operable in a hatchway, a plurality of stationary contact members, a movable member disposed to sequentially engage said stationary contact members, motive means for actuating said movable member, means responsive to movement of said car a predetermined distance for rendering said motive means effective to actuate said movable member, and means responsive to operation of said motive means for stopping further operation thereof.

26. In a floor selector for an elevator car operable past a plurality of floors, a stationary member, a movable member, a motor for actuating the movable member along the stationary member, means alternately responsive to the operation of the car for starting said motor in operation, means operably responsive to the movable member for stopping the operation of said motor, and means responsive to a reversing operation of the car for reversing the direction of operation of said movable member.

27. In a floor selector for an elevator car operable past a plurality of floors, a stationary member, a movable member, a motor for actuating the movable member along the stationary member, means operably responsive to movement of the car from one floor to another floor for starting the motor in operation, means operably responsive to movement of the movable member for stopping the motor, and means responsive to a reversing operation of the car for reversing the operation of said movable member.

28. In a floor selector for an elevator car operable past a plurality of floors, a stationary member, a movable member, a motor for actuating the movable member along the stationary member, means operably responsive to movement of the car from one floor to another floor for starting the motor in operation, means operably responsive to a predetermined movement of the movable member for stopping the motor, and means responsive to a reversing operation of the car for reversing the operation of said movable member.

29. In a floor selector for an elevator car operable in a hatchway past a plurality of floors, a stationary member, a movable member, a motor for actuating the movable member along the stationary member, a device mounted in the hatchway, means mounted on the car to be operated by the device in the hatchway upon movement of the car past said device for starting said motor in operation, means operably responsive to operation of the movable member for stopping the motor, and means responsive to a reversing operation of the car for reversing the operation of said movable member.

30. In a floor selector for an elevator car operable in a hatchway past a plurality of floors, a stationary member, a movable member, a motor for actuating the movable member along the stationary member, a device mounted in the hatchway, means mounted on the car to be operated by the device in the hatchway upon movement of the car past said device for starting said motor in operation, means operably responsive to operation of the movable member a predetermined distance for stopping said motor, and means responsive to a reversing operation of the car for reversing the operation of said movable member.

31. In a floor selector for an elevator car operable in a hatchway past a plurality of floors, a stationary member, a movable member, a motor for actuating the movable member along the stationary member, an inductor plate disposed in the hatchway, between two adjacent floors, an inductor relay disposed on the car in position to be operated by the inductor plate when the car passes the plate for starting the motor in operation, means responsive to movement of the movable member for stopping the motor, and means responsive to a reversing operation of the car for reversing the operation of said movable member.

32. In a floor selector for an elevator car operable in a hatchway past a plurality of floors, a stationary member, a movable member, a motor for actuating the movable member along the stationary member, a plurality of inductor plates mounted in the hatchway, each of the plates being disposed between each two adjacent floors, an inductor relay disposed on the car in position to be operated by an inductor plate upon movement of the car from one floor to the next floor for starting said motor in operation, means responsive to a predetermined movement of the movable member for stopping the motor, and means responsive to a reversing operation of the car for reversing the operation of said movable member.

33. In a floor selector for an elevator car operable in a hatchway past a plurality of floors, a plurality of stationary members one for each floor, a movable member, a motive means for actuating the movable member to sequentially engage the stationary members, means responsive to operation of the car past a predetermined point in the hatchway for starting said motive means in operation, and means responsive to movement of the movable member a predetermined distance for stopping said motive means.

34. In an elevator having a car operable past a plurality of floors, control means for starting, stopping and reversing the operation of the car, an auxiliary device, a motor for operating the said device in accordance with the movements of the car, means responsive to operation of the car for starting said motor in operation, means responsive to movement of the device a predetermined distance for stopping the motor, and means responsive to operation of the control means to reverse the car for reversing the operation of the device.

CHARLES E. ELLIS, JR.